US012775304B2

(12) United States Patent
Jiang et al.

(10) Patent No.: US 12,775,304 B2
(45) Date of Patent: Oct. 27, 2026

(54) TIME SYNCHRONIZATION METHOD AND RELATED APPARATUS

(71) Applicant: Yinwang Intelligent Technologies Co., Ltd., Shenzhen (CN)

(72) Inventors: Chaofeng Jiang, Shenzhen (CN); Lei Han, Hangzhou (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 153 days.

(21) Appl. No.: 18/613,341

(22) Filed: Mar. 22, 2024

(65) Prior Publication Data

US 2025/0251752 A1 Aug. 7, 2025

Related U.S. Application Data

(63) Continuation of application No. PCT/CN2021/120455, filed on Sep. 24, 2021.

(51) Int. Cl.
*G06F 1/12* (2006.01)

(52) U.S. Cl.
CPC ...................................... *G06F 1/12* (2013.01)

(58) Field of Classification Search
CPC ................. G06F 1/32; G06F 9/44; G06F 1/12
See application file for complete search history.

(56) References Cited

U.S. PATENT DOCUMENTS

| | | | | |
|---|---|---|---|---|
| 10,168,418 | B1 * | 1/2019 | Al-Stouhi | G01S 13/931 |
| 2010/0110097 | A1 * | 5/2010 | Nam | H05B 45/10<br>345/589 |

FOREIGN PATENT DOCUMENTS

| | | | |
|---|---|---|---|
| CN | 110620632 | A | 12/2019 |
| CN | 110720096 | A | 1/2020 |
| CN | 111447032 | A | 7/2020 |

* cited by examiner

*Primary Examiner* — Keshab R Pandey
(74) *Attorney, Agent, or Firm* — Conley Rose, P.C.

(57) ABSTRACT

A time synchronization method includes obtaining time information of an external clock source and a current driving status of the intelligent driving device; then determining whether the current driving status is a driving status in which time synchronization processing needs to be performed on a local clock of the domain controller; and when the current driving status is the driving status in which time synchronization processing needs to be performed, performs time synchronization processing on the local clock based on the time information of the external clock source.

20 Claims, 5 Drawing Sheets

TIME SYNCHRONIZATION METHOD AND RELATED APPARATUS

CROSS-REFERENCE TO RELATED APPLICATIONS

This is a continuation of International Patent Application No. PCT/CN2021/120455 filed on Sep. 24, 2021, the disclosure of which is hereby incorporated by reference in its entirety.

TECHNICAL FIELD

The present disclosure relates to the field of intelligent driving, and more specifically, to a time synchronization method and a related apparatus.

BACKGROUND

With rapid development of science and technology, an intelligent driving technology has attracted more and more attention, and therefore a plurality of intelligent driving devices are generated. These intelligent driving devices may include, for example, a self-driving vehicle and an unmanned aerial vehicle. A domain controller of an existing intelligent driving device may receive external coordinated universal time (UTC) information by using a global navigation satellite system (GNSS) or a network protocol. If the domain controller of the intelligent driving device receives the UTC information, the domain controller of the intelligent driving device may update a time on a local clock to the UTC, to provide an accurate UTC for the intelligent driving device.

It is found through analysis that, when the intelligent driving device is at a location at which the GNSS or a network signal is lost, for example, in a tunnel or a basement, there is a risk that the domain controller of the intelligent driving device cannot receive the UTC information. In this case, the domain controller of the intelligent driving device cannot update the time on the local clock to the UTC. Further, when the intelligent driving device is at the location at which the GNSS or the network signal is lost, for example, in the tunnel or the basement, for a longer time, a larger accumulated deviation is gradually generated between the time on the local clock of the domain controller and the UTC due to an error of a crystal oscillator frequency of the local clock of the domain controller. In this scenario, if the intelligent driving device suddenly travels out of a garage or a tunnel and receives the UTC information, because a difference between the time on the local clock of the domain controller of the intelligent driving device and the UTC is large, the time on the local clock of the domain controller of the intelligent driving device will jump.

In this case, for each of sensors in the intelligent driving device, because the time on the local clock of the domain controller of the intelligent driving device jumps, each sensor also needs to synchronize a time on a clock in the sensor to the UTC. However, because synchronization of each sensor needs some time, in a synchronization process, the time of the sensor may have a large deviation from a timestamp of the domain controller. Alternatively, because synchronization speeds of the sensors may be different, the clocks in the sensors may not be aligned in terms of time, and consequently timestamps of data that is actually collected at a same time by different sensors are different. In this case, a data timestamp obtained by the domain controller of the intelligent driving device may be greatly different from a real data collection time. Consequently, an incorrect driving decision may be made, and security of the intelligent driving device is further affected.

Therefore, how to reduce negative impact of time synchronization of the local clock of the domain controller of the intelligent driving device on security of the intelligent driving device becomes a technical problem that urgently needs to be resolved.

SUMMARY

The present disclosure provides a time synchronization method and a related apparatus, to reduce negative impact of time synchronization of a local clock of a domain controller of an intelligent driving device on security of the intelligent driving device.

According to a first aspect, the present disclosure provides a time synchronization method. The method is applied to a domain controller of an intelligent driving device, and includes: obtaining time information of an external clock source of the domain controller of the intelligent driving device; obtaining a current driving status of the intelligent driving device; determining whether the current driving status is a driving status in which time synchronization processing needs to be performed on a local clock of the domain controller; and if the current driving status is the driving status in which time synchronization processing needs to be performed, performing time synchronization processing on the local clock based on the time information of the external clock source.

According to the time synchronization method provided in this embodiment of the present disclosure, the current driving status of the intelligent driving device is used as a constraint for determining whether time synchronization processing is to be performed, and only when the current driving status of the intelligent driving device is the driving status in which time synchronization processing needs to be performed, time synchronization processing is performed on the local clock of the domain controller based on the time information of the external clock source. It may be understood that the time synchronization method provided in this embodiment of the present disclosure can reduce negative impact of performing time synchronization by the domain controller of the intelligent driving device on security of the intelligent driving device.

For example, in a conventional technology, regardless of a driving status of the intelligent driving device, when receiving the time information of the external clock source, the domain controller performs time synchronization processing. However, when the intelligent driving device travels in an intelligent driving state, some applications are highly sensitive to time (that is, if a time on the local clock jumps, security of the intelligent driving device may be seriously affected). For example, the intelligent driving device is currently in a self-driving state, no driver operation is required, and all functions are implemented by using software. In this case, it is assumed that the time on the local clock of the domain controller of the intelligent driving device is greatly different from the time information of the external clock source. If time synchronization is still performed, the time on the local clock of the domain controller of the intelligent driving device will jump. In this case, sensors in the intelligent driving device also synchronize times in the sensors to the time information of the external clock source. However, because synchronization of the sensors needs some time, in a synchronization process, the times of the sensors may have a large deviation from a timestamp of the domain controller, or because synchronization speeds of the sensors may be different, the times on the clocks in the sensors may not be the same, and consequently timestamps of data that is actually collected at a same time by different sensors are different. In this case, a data timestamp obtained by the domain controller of the intelligent driving device may be greatly different from a real data collection time. When filtering fusion is performed based on the data, an incorrect result is obtained. Further, a subsequent decision of the domain controller of the intelligent driving device is affected, and security of the intelligent driving device may be affected. In this solution, before time synchronization is performed, whether the current driving status is the driving status in which time synchronization processing needs to be performed is first determined. The domain controller performs time synchronization only when the current driving status is the driving status in which time synchronization processing needs to be performed. If the current driving status is a driving status in which time synchronization processing does not need to be performed, the domain controller does not perform time synchronization processing on the local clock based on the time information of the external clock source. In this way, a security problem caused by a jump does not occur. Therefore, the negative impact of time synchronization of the local clock of the domain controller of the intelligent driving device on security of the intelligent driving device is reduced.

With reference to the first aspect, in a possible implementation, one or more of the following states of the intelligent driving device are the driving statuses in which time synchronization processing needs to be performed: a pre-start state, a start state, a standby state, or an upgrade state; and one or more of the following states of the intelligent driving device are the driving statuses in which time synchronization processing does not need to be performed: an assisted driving state, a self-driving state, a sleep state, or a power-off state.

In this implementation, if the current driving status of the intelligent driving device is one of the pre-start state, the start state, the standby state, or the upgrade state, the domain controller may perform time synchronization processing on the local clock based on the time information of the external clock source, so that the time on the local clock of the domain controller of the intelligent driving device may be synchronized to the time information of the external clock source based on a premise that security of the intelligent driving device is ensured. If the current driving status is the assisted driving state, the self-driving state, the sleep state, or the power-off state, the domain controller does not perform time synchronization processing on the local clock based on the time information of the external clock source, so that security of the intelligent driving device is ensured.

With reference to the first aspect, in a possible implementation, the method further includes: obtaining time synchronization information, where the time synchronization information includes a time synchronization manner corresponding to each of at least one driving status of the intelligent driving device, and the at least one driving status includes the current driving status. The determining whether the current driving status is a driving status in which time synchronization processing needs to be performed on a local clock of the domain controller includes: when determining, based on the time synchronization information, that a time synchronization manner corresponding to the current driving status is not empty, determining that the current driving status is the driving status in which time synchronization processing needs to be performed on the local clock.

In this implementation, different driving statuses may further correspond to different time synchronization manners. For example, some driving statuses correspond to one or more time synchronization manners, and some driving statuses do not have a time synchronization manner. In this case, the domain controller of the intelligent driving device may determine, by determining whether the time synchronization manner corresponding to the current driving status is empty, whether time synchronization processing needs to be performed in the current driving status.

With reference to the first aspect, in a possible implementation, a plurality of time synchronization manners corresponding to any one of one or more of the following states include a moment synchronization manner, a frequency synchronization manner, and a locking manner: the pre-start state or the standby state; and a plurality of time synchronization manners corresponding to any one of one or more of the following states include the frequency synchronization manner and the locking manner: the start state or the upgrade state.

With reference to the first aspect, in a possible implementation, when the current driving status corresponds to the plurality of time synchronization manners, the performing time synchronization processing on the local clock based on the time information of the external clock source includes: obtaining time information of the local clock of the domain controller of the intelligent driving device; determining a time difference between the time information of the local clock and the time information of the external clock source based on the time information of the local clock and the time information of the external clock source; selecting a target time synchronization manner from the plurality of time synchronization manners based on the time difference; and performing, based on the time information of the external clock source, time synchronization processing on the local clock by using the target time synchronization manner.

For example, the selecting a target time synchronization manner from the plurality of time synchronization manners based on the time difference includes: if the time difference is less than a first time threshold, determining that the locking manner is the target time synchronization manner; if the time difference is greater than a first time threshold and less than a second time threshold, determining that the frequency synchronization manner is the target time synchronization manner; or if the time difference is greater than a second time threshold, determining that the moment synchronization manner is the target time synchronization manner. The first time threshold is a preset minimum value of the time difference between the time information of the external clock source and the time information of the local clock, and the second time threshold is a preset maximum value of the time difference between the time information of the external clock source and the time information of the local clock.

In this implementation, the domain controller of the intelligent driving device may perform, based on the time difference between the time information of the local clock and the time information of the external clock source, time synchronization processing on the local clock by using different time synchronization manners. When the time difference is large, the moment synchronization manner is used to quickly synchronize the time on the local clock with time of the external clock source. When the time difference is small, the frequency synchronization manner or the locking manner is used to synchronize the time on the local clock with time of the external clock source in a stable manner.

With reference to the first aspect, in a possible implementation, when it is determined that the frequency synchronization manner is the target time synchronization manner, the performing, based on the time information of the external clock source, time synchronization processing on the local clock by using the target time synchronization manner includes: determining, according to a formula $\Delta f_{adjust}=a_0\Delta T+a_1\Delta f+a_2v+a_3P_0+a_4P_1+\ldots+a_{n+3}P_n$, a clock frequency adjustment value of the local clock that is used when time synchronization processing is performed on the local clock; and adjusting a clock frequency of the local clock based on the clock frequency adjustment value, where $\Delta f_{adjust}$ represents the clock frequency adjustment value of the local clock, $\Delta T$ represents the time difference, $\Delta f$ represents a frequency difference between a clock frequency of the external clock source and the clock frequency of the local clock, v represents a traveling speed of the driving device, $P_i$ represents a parameter required by an $i^{th}$ service in the intelligent driving device for the frequency synchronization manner, and $a_i$ represents a coefficient.

In this implementation, the clock frequency adjustment value is obtained by combining a vehicle speed of the intelligent driving device and the parameter required by a service in the intelligent driving device for the frequency synchronization manner, so that the obtained clock frequency adjustment value can integrate requirements of the services of the intelligent driving device in the current driving status, and robustness is therefore improved.

According to a second aspect, the present disclosure provides a time synchronization apparatus. The apparatus is used in an intelligent driving device, and may include functional modules configured to implement any one of the first aspect or the possible implementations of the first aspect, and any functional module may be implemented by using hardware or software.

For example, the apparatus includes: an obtaining module, a determining module, and a processing module.

The obtaining module is configured to obtain time information of an external clock source of a domain controller of the intelligent driving device and a current driving status of the intelligent driving device. The determining module is configured to determine whether the current driving status is a driving status in which time synchronization processing needs to be performed on a local clock of the domain controller. The processing module is configured to: if the current driving status is the driving status in which time synchronization processing needs to be performed, perform time synchronization processing on the local clock based on the time information of the external clock source.

With reference to the second aspect, in a possible implementation, one or more of the following states of the intelligent driving device are the driving statuses in which time synchronization processing needs to be performed: a pre-start state, a start state, a standby state, or an upgrade state; and one or more of the following states of the intelligent driving device are driving statuses in which time synchronization processing does not need to be performed: an assisted driving state, a self-driving state, a sleep state, or a power-off state.

With reference to the second aspect, in a possible implementation, the obtaining module is further configured to obtain time synchronization information, where the time synchronization information includes a time synchronization manner corresponding to each of at least one driving status of the intelligent driving device, and the at least one driving status includes the current driving status. The determining module is specifically configured to: when determining, based on the time synchronization information, that a time synchronization manner corresponding to the current driving status is not empty, determine that the current driving status is the driving status in which time synchronization processing needs to be performed on the local clock.

With reference to the second aspect, in a possible implementation, a plurality of time synchronization manners corresponding to any one of one or more of the following states include a moment synchronization manner, a frequency synchronization manner, and a locking manner: the pre-start state or the standby state; and a plurality of time synchronization manners corresponding to any one of one or more of the following states include the frequency synchronization manner and the locking manner: the start state or the upgrade state.

With reference to the second aspect, in a possible implementation, when the current driving status corresponds to the plurality of time synchronization manners, the obtaining module is further configured to obtain time information of the local clock of the domain controller of the intelligent driving device. The processing module is specifically configured to: determine a time difference between the time information of the local clock and the time information of the external clock source based on the time information of the local clock and the time information of the external clock source; select a target time synchronization manner from the plurality of time synchronization manners based on the time difference; and perform, based on the time information of the external clock source, time synchronization processing on the local clock by using the target time synchronization manner.

With reference to the second aspect, in a possible implementation, the processing module is specifically configured to: if the time difference is less than a first time threshold, determine that the locking manner is the target time synchronization manner; if the time difference is greater than a first time threshold and less than a second time threshold, determine that the frequency synchronization manner is the target time synchronization manner; or if the time difference is greater than a second time threshold, determine that the moment synchronization manner is the target time synchronization manner. The first time threshold is a preset minimum value of the time difference between the time information of the external clock source and the time information of the local clock, and the second time threshold is a preset maximum value of the time difference between the time information of the external clock source and the time information of the local clock.

With reference to the second aspect, in a possible implementation, when determining that the frequency synchronization manner is the target time synchronization manner, the processing module is specifically configured to: determine, according to a formula $\Delta f_{adjust}=a_0\Delta T+a_1\Delta f+a_2v+a_3P_0+a_4P_1+\ldots+a_{n+3}P_n$, a clock frequency adjustment value of the local clock that is used when time synchronization processing is performed on the local clock; and adjusting a clock frequency of the local clock based on the clock frequency adjustment value, where $\Delta f_{adjust}$ represents the clock frequency adjustment value of the local clock, $\Delta T$ represents the time difference, $\Delta f$ represents a frequency difference between a clock frequency of the external clock source and the clock frequency of the local clock, v represents a traveling speed of the driving device, $P_i$ represents a parameter required by an $i^{th}$ service in the intelligent driving device for the frequency synchronization manner, and $a_i$ represents a coefficient.

According to a third aspect, the present disclosure provides a time synchronization apparatus, including a memory and a processor. The memory is configured to store program instructions. The processor is configured to invoke the program instructions in the memory to perform the method according to any one of the first aspect or the possible implementations of the first aspect.

In some implementations, the apparatus may be a chip. In these implementations, optionally, the apparatus may further include a communication interface configured to communicate with another apparatus or device.

According to a fourth aspect, the present disclosure provides a computer-readable medium, where the computer-readable medium stores program code to be executed by a computer, and the program code is used to perform the method according to any one of the first aspect or the possible implementations of the first aspect.

According to a fifth aspect, the present disclosure provides a computer program product. The computer program product includes computer program code. When the computer program code is run on a computer, the computer is enabled to implement the method according to any one of the first aspect or the possible implementations of the first aspect.

According to a sixth aspect, the present disclosure provides an intelligent driving system. The system includes the apparatus according to any one of the second aspect, the third aspect, or the possible implementations of the second aspect or the third aspect.

According to a seventh aspect, the present disclosure provides an intelligent driving device. The device includes the apparatus according to any one of the second aspect, the third aspect, or the possible implementations of the second aspect or the third aspect, or the device includes the intelligent driving system according to the sixth aspect.

In an example, the intelligent driving device is a self-driving vehicle.

DESCRIPTION OF EMBODIMENTS

For ease of understanding, related terms used in the present disclosure are first described.

1. Time Synchronization

The time synchronization refers to a process of providing a unified time scale for a distributed system by performing some operations on a local clock. In a centralized system, all processes or modules may obtain time from a unique global clock of the system. Therefore, any two events in the system have a clear sequence. In the distributed system, the system cannot provide a unified global clock for modules that are independent of each other due to physical dispersion. Instead, each process or module maintains its own local clock. Timing rates and operating environments of these local clocks are different. Therefore, even if all local clocks are calibrated at a moment, these local clocks are inconsistent after a period of time. To ensure that these local clocks reach a same time value again, a time synchronization operation needs to be performed.

2. Time Synchronization Master Node

The time synchronization master node is a provider of time information and has a time source. The time synchronization master node is an entity that transmits a time reference to several slave nodes through a communication network.

3. Time Synchronization Slave Node

The time synchronization slave node is a consumer of time information, and is an entity that receives and processes a time reference through a communication network.

With rapid development of science and technology, an intelligent driving technology has attracted more and more attention, and therefore a plurality of intelligent driving devices are generated. These intelligent driving devices may include, for example, a self-driving vehicle and an unmanned aerial vehicle.

For a domain controller of an existing intelligent driving device, to provide an accurate UTC for the intelligent driving device, the domain controller of the intelligent driving device may receive UTC information by using a GNSS or a network protocol. If the domain controller of the intelligent driving device receives the UTC information, the domain controller of the intelligent driving device may update a time on a local clock to the UTC.

For ease of understanding, the following uses an example in which the local clock is a real-time clock (RTC) for description.

Figure 1:
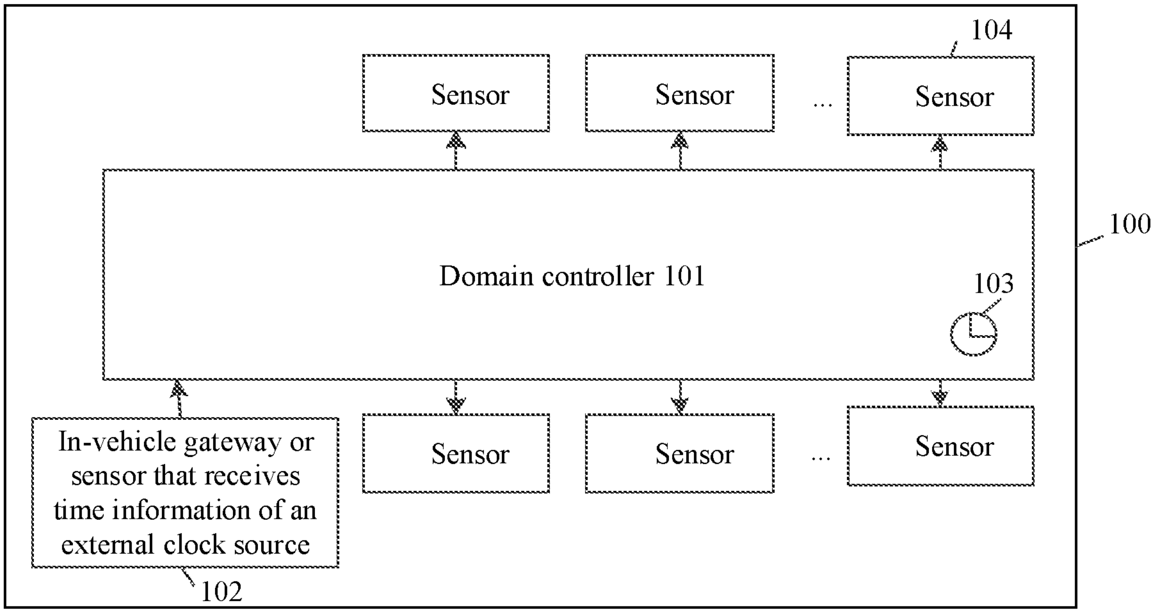
FIG. 1 is a schematic diagram of a structure of an application scenario according to an embodiment of the present disclosure.

FIG. 1 is a schematic diagram of a structure of a time synchronization system of an intelligent driving device according to an embodiment of the present disclosure. For ease of description, in the present disclosure, an example in which the intelligent driving device is an intelligent driving vehicle is used. As shown in FIG. 1, the time synchronization system 100 includes a domain controller 101, an in-vehicle gateway or a sensor 102 that receives time information of an external clock source, a local RTC 103 of the domain controller 101, and a sensor 104.

The domain controller 101 may be considered as a control system of the intelligent driving vehicle, for example, may be configured to perform an operation function of some intelligent driving algorithms, or perform functions such as decision making. The in-vehicle gateway or the sensor 102 that receives the time information of the external clock source is configured to receive the time information of the external clock source. The local RTC 103 of the domain controller 101 is configured to indicate a local time of the domain controller 101. The sensor 104 is configured to obtain, by the intelligent driving vehicle, external environmental information. For example, the sensor 104 is a camera sensor or a lidar sensor.

For the time synchronization system 100 shown in FIG. 1, the domain controller 101 needs to obtain a UTC by using the in-vehicle gateway or the sensor 102 that receives external clock information, and then synchronizes a time on the local RTC 103 of the domain controller 101 to the UTC, to provide an accurate UTC for the intelligent driving vehicle. Specifically, a method for synchronizing the domain controller 101 to the UTC is as follows: When the intelligent driving vehicle is started, a time maintained by the local RTC 103 of the domain controller is used as an initialization time. If there is no RTC in the domain controller of the intelligent driving vehicle, a default time in a built-in file system is used as the initialization time. Then, the domain controller 101 determines whether the time information of the external clock source is received. For example, the domain controller 101 may receive external time source information by using the in-vehicle gateway (telematics box, T-Box) or the sensor 102. The sensor is, for example, a GNSS sensor. If the domain controller 101 receives the time information of the external clock source, the domain controller 101 updates the time on the local RTC 103 to (also referred to as synchronizes to) the time information of the external clock source. If the domain controller 101 does not receive the time information of the external clock source, the domain controller 101 continues to keep a current time forward by using a local crystal oscillator.

In addition, after the domain controller 101 is synchronized to the UTC, the domain controller 101 needs to send a synchronized time on the local RTC 103 to the sensor 104, so that a time of each sensor 104 in the intelligent driving device is synchronized with the time on the RTC 103 of the domain controller 101. To be specific, the domain controller 101 serves as a time synchronization master node, and sends the time of the domain controller 101 to a slave device such as the sensor 104, so that a time of the slave device is the same as the time of the domain controller 101; and also serves as a time synchronization slave node, and performs time synchronization with the time information of the external clock source, so that a time of the intelligent driving vehicle follows the UTC as much as possible.

It should be noted herein that the present disclosure does not limit a manner in which the domain controller 101 sends the time on the local RTC 103 to the sensor 104, for example, by using a controller area network (CAN), a local area network (LAN), or another manner.

It may be understood that, when the intelligent driving device is at a location at which a GNSS or a network signal is lost, such as in a tunnel or a basement, there is a risk that the domain controller of the intelligent driving device cannot receive UTC information. In this case, the intelligent driving device cannot update the time on the local RTC 103 to the UTC. Further, when the intelligent driving device is at the location at which the GNSS or the network signal is lost, such as in the tunnel or the basement, for a longer time, a large accumulated deviation is gradually generated between the time on the local RTC 103 of the domain controller and the UTC due to an error of a crystal oscillator frequency of the local RTC 103 of the domain controller. In this scenario, if the intelligent driving device suddenly moves out of a garage or a tunnel and receives the UTC information, because a difference between the time on the local RTC 103 of the domain controller and the UTC is large, the time on the local RTC 103 of the domain controller of the intelligent driving device will jump.

In this case, when the time on the local RTC 103 of the domain controller of the intelligent driving device is about to jump, for sensors in the intelligent driving device, because the time on the local RTC of the domain controller of the intelligent driving device jumps, the sensors also need to synchronize times on clocks in the sensors to the UTC. However, because synchronization of the sensors needs some time, in a synchronization process, the times of the sensors may have a large deviation from a timestamp of the domain controller, or because synchronization speeds of the sensors may be different, the times on the clocks in the sensors may not be the same, and consequently timestamps of data that is actually collected at a same time by different sensors are different. In this case, a data timestamp obtained by the domain controller of the intelligent driving device may be greatly different from a real data collection time. Consequently, an incorrect driving decision may be made, and security of the intelligent driving device is further affected.

For example, the domain controller of the intelligent driving vehicle performs high-precision positioning. It is assumed that the intelligent driving vehicle includes a camera sensor and a lidar sensor. In this case, image data of a surrounding environment may be collected by using the camera sensor, point cloud data of the surrounding environment may be collected by using the lidar sensor, information fusion is then performed on the image data and the point cloud data to obtain fused target data, and finally, the target data is input into a positioning algorithm to determine a current location of the intelligent driving vehicle. In this case, if the time on the local RTC of the domain controller of the intelligent driving vehicle jumps, and the time on the local RTC is updated to the UTC, the camera sensor and the lidar sensor also need to synchronize times in the camera sensor and the lidar sensor to the UTC. However, speeds of synchronizing the camera sensor and the lidar sensor to the UTC may be different. Consequently, timestamps of data that is actually collected at a same time by the camera sensor and the lidar sensor are different. In this case, a data timestamp obtained by the domain controller of the intelligent driving device may be greatly different from a real data collection time. Consequently, an incorrect driving decision may be made, and security of the intelligent driving device is further affected.

Therefore, how to reduce negative impact of time synchronization of the local clock of the domain controller of the intelligent driving device on security of the intelligent driving device becomes a technical problem that urgently needs to be resolved.

In view of this, an embodiment of the present disclosure provides a time synchronization method. According to the time synchronization method provided in the present disclosure, a current driving status of an intelligent driving device is used as a constraint for determining whether time synchronization processing is to be performed, and only when the current driving status of the intelligent driving device is a driving status in which time synchronization processing needs to be performed, time synchronization processing is performed on a local clock based on time information of an external clock source. Further, time synchronization processing may be performed, based on a time difference between time information of the local clock and the time information of the external clock source, on the local clock by using different time synchronization manners.

Figure 2:
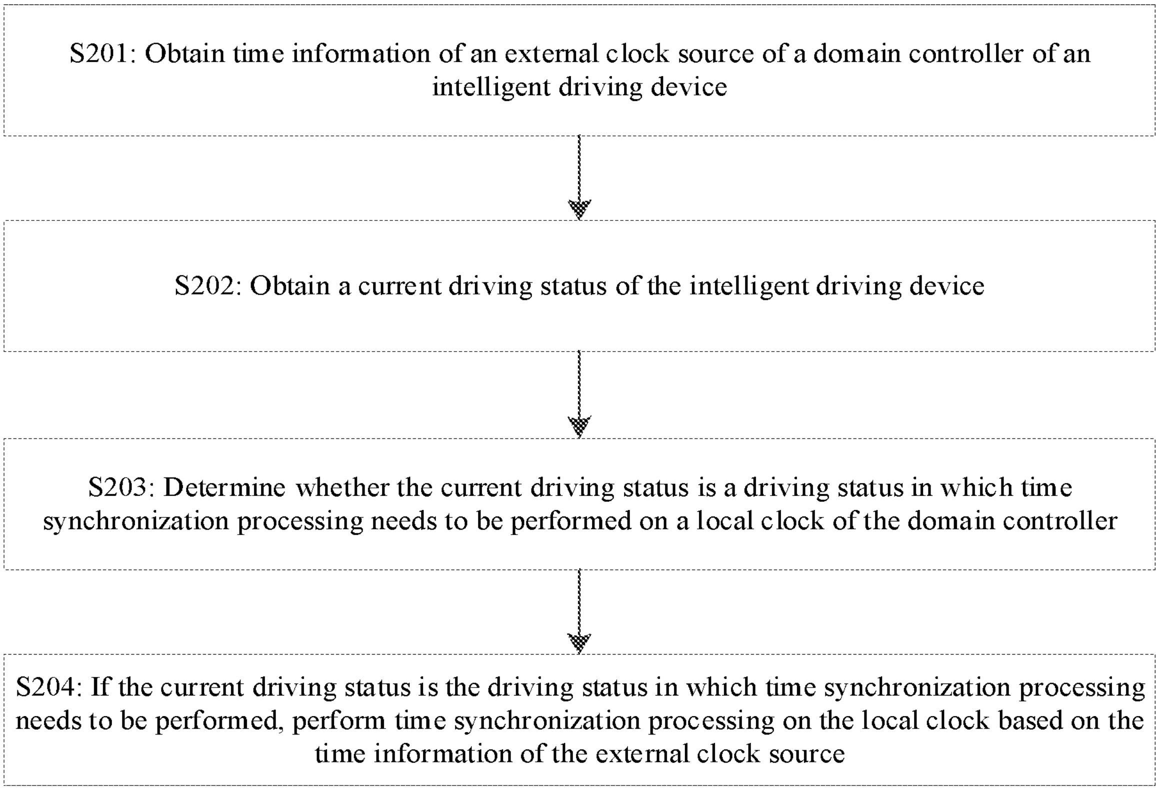
FIG. 2 is a schematic flowchart of a time synchronization method according to an embodiment of the present disclosure.

FIG. 2 is a schematic flowchart of a time synchronization method according to an embodiment of the present disclosure. In the embodiment shown in FIG. 2, the time synchronization method may be performed by a domain controller in an intelligent driving device, for example, may be performed by the domain controller 101 in the intelligent driving vehicle in FIG. 1. As shown in FIG. 2, the method provided in this embodiment of the present disclosure includes S201, S202, S203, and S204. The following describes the steps in the method shown in FIG. 2 in detail.

S201: Obtain time information of an external clock source of the domain controller of the intelligent driving device.

The time information of the external clock source refers to time information in the real world, for example, a UTC.

In this embodiment, the domain controller of the intelligent driving device may actively obtain the time information of the external clock source. For example, the domain controller of the intelligent driving device may actively obtain the time information of the external clock source in a periodic obtaining manner. For example, the domain controller of the intelligent driving device obtains the time information of the external clock source every 100 microseconds.

In this embodiment, the domain controller of the intelligent driving device may also obtain the time information of the external clock source based on a trigger condition.

For example, the domain controller of the intelligent driving device triggers obtaining of the time information of the external clock source only after receiving an instruction for obtaining the time information of the external clock source.

It should be noted herein that a manner in which the domain controller of the intelligent driving device obtains the time information of the external clock source is not limited in this embodiment of the present disclosure.

For example, in a possible implementation, the domain controller of the intelligent driving device may obtain the time information of the external clock source by using a sensor, for example, a GNSS sensor.

For another example, in another possible implementation, the domain controller of the intelligent driving device may obtain the time information of the external clock source by using a network protocol. For example, common time synchronization network protocols include: network time protocol (NTP), generalized precision time protocol (gPTP), precision time protocol (PTP), pulse per second (PPS) and recommended location information (recommended minimum specific Global Positioning System (GPS)/transit data, global positioning recommended minimum (GPRMC)), CAN, Time-Sensitive Networking (TSN), and the like. For details about how to obtain the time information of the external clock source by using the network protocol, refer to descriptions in the conventional technology.

S202: Obtain a current driving status of the intelligent driving device.

A driving status may be understood as a system working status when the intelligent driving device runs. In different system working statuses, the intelligent driving device may be executed by using different process components, to cooperate to implement functions that may be implemented by the intelligent driving device in those statuses.

For example, the driving status is a self-driving state. In the self-driving state, the intelligent driving device may autonomously complete functions such as parking, autonomous obstacle avoidance, and autonomous parking without an operation of a driver. For descriptions of a concept of self-driving and the self-driving state, refer to descriptions in the conventional technology.

In an example, in this embodiment, the domain controller of the intelligent driving device may periodically obtain the driving status of the intelligent driving device.

It should be noted herein that an implementation in which the domain controller of the intelligent driving device obtains the current driving status is not limited in this embodiment of the present disclosure. For a specific implementation, refer to the conventional technology.

S203: Determine whether the current driving status is a driving status in which time synchronization processing needs to be performed on a local clock of the domain controller.

For example, when the current driving status of the intelligent driving device is the self-driving state, the domain controller of the intelligent driving device first determines whether the self-driving state is the driving status in which time synchronization processing needs to be performed on the local clock of the domain controller of the intelligent driving device.

In a possible implementation, a first mapping relationship between each of at least one driving status and whether the domain controller of the intelligent driving device performs time synchronization processing on the local clock in each of the at least one driving status may be stored in the domain controller of the intelligent driving device. Then, after obtaining the current driving status, the domain controller of the intelligent driving device determines, based on the first mapping relationship, whether time synchronization processing needs to be performed on the local clock of the domain controller in the current driving status. For example, it is assumed that the first mapping relationship stored in the domain controller of the intelligent driving device includes the self-driving state and the fact that time synchronization processing needs to be performed on the local clock of the domain controller in the self-driving state. In this case, if the current driving status obtained by the domain controller of the intelligent driving device is the self-driving state, it is determined that time synchronization processing needs to be performed on the local clock of the domain controller.

S204: If the current driving status is the driving status in which time synchronization processing needs to be performed, perform time synchronization processing on the local clock based on the time information of the external clock source.

In this embodiment, when the current driving status of the intelligent driving device is the driving status in which time synchronization processing needs to be performed, time synchronization processing is performed on the local clock based on the time information of the external clock source. In other words, if the current driving status is a driving status in which time synchronization processing does not need to be performed, time synchronization processing is not performed on the local clock based on the time information of the external clock source.

For a concept of time synchronization and a process of performing time synchronization processing, refer to descriptions in the conventional technology.

According to the time synchronization method provided in this embodiment of the present disclosure, the current driving status of the intelligent driving device is used as a constraint for determining whether time synchronization is to be performed, and only when the current driving status of the intelligent driving device is the driving status in which time synchronization needs to be performed, time synchronization processing is performed on the local clock based on the time information of the external clock source. It may be understood that the time synchronization method provided in this embodiment of the present disclosure can reduce negative impact of performing time synchronization by the domain controller of the intelligent driving device on security of the intelligent driving device.

For example, in a conventional technology, regardless of a driving status of the intelligent driving device, when receiving the time information of the external clock source, the domain controller performs time synchronization processing. However, when the intelligent driving device travels in an intelligent driving state, some applications are highly sensitive to time (that is, if a time on the local clock jumps, security of the intelligent driving device may be seriously affected). For example, the intelligent driving device is currently in the self-driving state, no driver operation is required when the intelligent driving device is in the self-driving state, and all functions are implemented by using software. In this case, it is assumed that the time on the local clock of the domain controller of the intelligent driving device is greatly different from the time information of the external clock source. If time synchronization is still performed, the time on the local clock of the domain controller of the intelligent driving device will jump. In this case, sensors in the intelligent driving device also synchronize times in the sensors to the time information of the external clock source. However, because synchronization of the sensors needs some time, in a synchronization process, the times of the sensors may have a large deviation from a timestamp of the domain controller, or because synchronization speeds of the sensors may be different, the times on the clocks in the sensors may not be the same, and consequently timestamps of data that is actually collected at a same time by different sensors are different. In this case, a data timestamp obtained by the domain controller of the intelligent driving device may be greatly different from a real data collection time. When filtering fusion is performed based on the data, an incorrect result is obtained. Further, a subsequent decision of the intelligent driving device is affected, and security of the intelligent driving device may be affected. In this solution, before time synchronization is performed, whether the current driving status is the driving status in which time synchronization processing needs to be performed is first determined. The domain controller performs time synchronization only when the current driving status is the driving status in which time synchronization processing needs to be performed. If the current driving status is the driving status in which time synchronization processing does not need to be performed, the domain controller does not perform time synchronization processing on the local clock based on the time information of the external clock source. In this way, a security problem caused by a jump does not occur. Therefore, the negative impact of time synchronization of the local clock of the domain controller of the intelligent driving device on security of the intelligent driving device is reduced.

In an optional embodiment, one or more of the following states of the intelligent driving device are the driving statuses in which time synchronization processing needs to be performed: a pre-start state, a start state, a standby state, or an upgrade state; and one or more of the following states of the intelligent driving device are the driving statuses in which time synchronization processing does not need to be performed: an assisted driving state, a self-driving state, a sleep state, or a power-off state.

In this embodiment, the driving status includes but is not limited to the pre-start state, the start state, the assisted driving state, the self-driving state, the standby state, the upgrade state, the sleep state, and the power-off state.

According to classification of the Society of Automotive Engineers (SAE), self-driving can be divided into six phases: L0 to L5. L1 and L2 are driving assistance systems, and a driver is a subject of a vehicle operation. L3 and L4 are conditional self-driving systems. Therefore, for concepts and detailed descriptions of the assisted driving state and the self-driving state, refer to descriptions in the conventional technology.

It may be understood that, for the assisted driving state and the self-driving state, some or all functions of the assisted driving state and the self-driving state may not need a manual operation. Instead, intelligent decision-making is performed by using the domain controller of the intelligent driving device. Therefore, for the assisted driving state and the self-driving state, if the time on the local clock of the domain controller is updated, security of the intelligent driving device may be greatly affected, that is, sensitivity to time is very high. Therefore, in this embodiment, when the driving status of the intelligent driving device is the assisted driving state and the self-driving state, time synchronization processing is not performed on the local clock based on the time information of the external clock source.

The pre-start state may be considered as a state in which basic software of the intelligent driving device is initialized but some algorithm running tasks have not been executed. The running tasks may be considered as various types of algorithm processing that need to be executed, for example, a positioning algorithm or some decision algorithms. The standby state may be considered as a state in which the intelligent driving device can perform a next operation only after receiving an input task.

It may be understood that, if the time on the local clock of the domain controller of the intelligent driving device jumps, for the pre-start state, because some running tasks are not actually executed, even if the time on the local clock of the domain controller of the intelligent driving device jumps, security of the intelligent driving device is not affected, that is, sensitivity to time is low. For example, a moment at which the driver starts an engine belongs to the pre-start state. However, for the standby state, because an instruction needs to be received, if the instruction is not received, the domain controller of the intelligent driving device may not randomly move or execute some algorithms. Therefore, for the standby state, even if the time on the local clock of the domain controller of the intelligent driving device jumps, security of the intelligent driving device is not affected, that is, sensitivity to time is also low.

Therefore, for the pre-start state and the standby state, it may be considered that when the time on the local clock of the domain controller of the intelligent driving device jumps, security of the intelligent driving device is unlikely to be affected. Therefore, on a premise that security of the intelligent driving device is ensured, to further provide accurate time information of the external clock source for the intelligent driving device, time synchronization processing may be performed on the pre-start state and the standby state.

The start state may be considered as a state in which some running tasks may be executed in the intelligent driving device, and the upgrade state may be similar to an upgrade state of a terminal device (for example, a mobile phone).

It may be understood that, for the start state and the upgrade state, if a difference between the time on the local clock of the domain controller of the intelligent driving device and the time information of the external clock source is large, when the domain controller of the intelligent driving device receives the time information of the external clock source, if the domain controller of the intelligent driving device directly adjusts the time on the local clock to the time information of the external clock source, problem traceability and fault locatability of a function of the intelligent driving device may be affected. In other words, it may be considered that the start state and the upgrade state have medium sensitivity to time. For example, if the time information of the external clock source is 12:00, and the time on the local clock of the domain controller of the intelligent driving device is 10:00, and if 10:00 is directly adjusted to 12:00, problem traceability and fault locatability of the function of the intelligent driving device may be affected. However, if the time on the local clock of the domain controller of the intelligent driving device is slowly adjusted, by a small amount, to the time information of the external clock source, for example, adjusted to 10:05 first, problem traceability and fault locatability of the function of the intelligent driving device may not be affected on a basis that security is ensured. In addition, updating of the time on the local clock can be ensured.

The sleep state and the power-off state may also be similar to a sleep state and a power-off state of the terminal device (for example, the mobile phone).

In an optional embodiment, the method further includes: obtaining time synchronization information, where the time synchronization information includes a time synchronization manner corresponding to each of the at least one driving status of the intelligent driving device, and the at least one driving status includes the current driving status. The determining whether the current driving status is a driving status in which time synchronization processing needs to be performed on a local clock of the domain controller includes: when determining, based on the time synchronization information, that a time synchronization manner corresponding to the current driving status is not empty, determining that the current driving status is the driving status in which time synchronization processing needs to be performed on the local clock.

The time synchronization manner may be understood as a specific implementation process in which the domain controller of the intelligent driving device synchronizes the time on the local clock to a time of the external clock source.

It may be understood that, in the current driving status, if the time synchronization information obtained by the domain controller of the intelligent driving device includes one or more time synchronization manners, that is, a time synchronization manner that may be selected is not empty, it indicates that the current driving status is the driving status in which time synchronization processing needs to be performed. On the contrary, in the current driving status, if the time synchronization information obtained by the domain controller of the intelligent driving device does not include a time synchronization manner that may be selected, that is, the time synchronization manner that may be selected is empty, it indicates that the current driving status is the driving status in which time synchronization processing does not need to be performed.

In a possible implementation, a second mapping relationship between each of the at least one driving status and a time synchronization manner that may be selected by the intelligent driving device in each of the at least one driving status may be first stored in the domain controller of the intelligent driving device. In this case, when the domain controller determines whether the current driving status is the driving status in which time synchronization processing needs to be performed on the local clock of the intelligent driving device, the method includes: determining, based on the second mapping relationship, the time synchronization manner that may be selected by the intelligent driving device in the current driving status; and if the time synchronization manner corresponding to the current driving status is not empty, determining that the current driving status is the driving status in which time synchronization processing needs to be performed on the local clock.

In the time synchronization method provided in this embodiment, different driving statuses may further correspond to different time synchronization manners. For example, some driving statuses correspond to one or more time synchronization manners, and some driving statuses do not have a corresponding time synchronization manner. Then, whether time synchronization processing needs to be performed in the current driving status is determined by determining whether the time synchronization manner corresponding to the current driving status is empty.

In an optional embodiment, as shown in Table 1, "–" in Table 1 indicates that there is no time synchronization information. When the driving status is the pre-start state or the standby state, a plurality of corresponding time synchronization manners include a moment synchronization manner, a frequency synchronization manner, and a locking manner. When the driving status is the start state or the upgrade state, a plurality of corresponding time synchronization manners include a frequency synchronization manner and a locking manner.

TABLE 1

Correspondence between a driving status and time synchronization information

| Driving status | Time synchronization information |
|---|---|
| Pre-start state | Moment synchronization, frequency synchronization, and locking |
| Start state | Frequency synchronization and locking |
| Assisted driving state | — |
| Self-driving state | — |
| Standby state | Moment synchronization, frequency synchronization, and locking |
| Upgrade state | Frequency synchronization and locking |
| Sleep state | — |
| Power-off state | — |

In this embodiment, the time synchronization manner may include three synchronization manners: the moment synchronization manner, the frequency synchronization manner, and the locking manner.

The moment synchronization manner means that a moment of the local clock is adjusted by a large amount, so that the moment of the local clock of the domain controller of the intelligent driving device is immediately adjusted to a moment of the external clock source. For example, if a current UTC is 12:00, and the time on the local clock of the domain controller of the intelligent driving device is 6:00, the time on the local clock is directly adjusted from 6:00 to 12:00.

The frequency synchronization manner and the locking manner mean that a clock frequency of the local clock is adjusted, so that the time on the local clock of the domain controller of the intelligent driving device is gradually synchronized with the time of the external clock source. For example, if the current UTC is 12:00, and the time on the local clock of the domain controller of the intelligent driving device is 11:00, the clock frequency of the local clock may be adjusted to accelerate a speed of the local clock, so that the time on the local clock is gradually synchronized to 12:00. In this embodiment, a difference between the frequency synchronization manner and the locking manner is that an amount by which a clock frequency is adjusted in the frequency synchronization manner is greater than an amount by which a clock frequency is adjusted in the locking manner.

As described in the foregoing embodiment, the pre-start state and the standby state have a characteristic that each running task in the intelligent driving device has a low sensitivity level to time. Therefore, even if the time on the local clock of the domain controller of the intelligent driving device jumps, security of the intelligent driving device is almost not affected. Therefore, for the pre-start state and the standby state, a selection may be randomly made from the moment synchronization manner, the frequency synchronization manner, and the locking manner, so that time synchronization processing may be further performed on a premise that security of the intelligent driving device is ensured, to track the time information of the external clock source.

As described in the foregoing embodiment, the start state and the upgrade state have a characteristic that each running task in the intelligent driving device has a medium sensitivity level to time. When the domain controller of the intelligent driving device receives the time information of the external clock source, if the domain controller of the intelligent driving device directly adjusts the time on the local clock to the time information of the external clock source, problem traceability and fault locatability of the intelligent driving device after an accident happens may be affected. However, if the time on the local clock is gradually synchronized, by a small amount, to the time information of the external clock source, problem traceability and fault locatability of the function of the intelligent driving device may not be affected on a basis that security is ensured. In addition, updating of the time on the local clock can be ensured. Therefore, for the start state and the upgrade state, the frequency synchronization manner and the locking manner are used.

As described in the foregoing embodiment, the assisted driving state and the self-driving state have a characteristic that some or all functions of the assisted driving state and the self-driving state may not need a manual operation. Instead, intelligent decision-making is performed by using the domain controller of the intelligent driving device, that is, sensitivity to time is very high. Therefore, in this embodiment, when the driving status of the intelligent driving device is the assisted driving state and the self-driving state, no time synchronization manner is set for the intelligent driving device, that is, time synchronization processing is not performed on the local clock based on the time information of the external clock source, so that security of the intelligent driving device is ensured.

Further, when the current driving status corresponds to the plurality of time synchronization manners, to determine a specific synchronization manner of the current driving status, the performing time synchronization processing on the local clock based on the time information of the external clock source includes: obtaining time information of the local clock of the domain controller of the intelligent driving device; determining a time difference between the time information of the local clock and the time information of the external clock source based on the time information of the local clock and the time information of the external clock source; selecting a target time synchronization manner from the plurality of time synchronization manners based on the time difference; and performing, based on the time information of the external clock source, time synchronization processing on the local clock by using the target time synchronization manner.

In this embodiment, there may be a plurality of time synchronization manners included in the time synchronization information obtained by the domain controller of the intelligent driving device in the current driving status. In this case, how to select a proper time synchronization manner to perform time synchronization processing on the local clock becomes a problem to be resolved.

In this embodiment, the specific time synchronization manner is determined based on the time difference between the time information of the local clock and the time information of the external clock source, that is, the target time synchronization manner is determined.

It can be learned from the description in the foregoing embodiment that the moment synchronization manner means that the moment of the local clock is adjusted by the large amount, so that the moment of the local clock of the domain controller of the intelligent driving device is immediately adjusted to the moment of the external clock source. The frequency synchronization manner and the locking manner mean that the clock frequency of the local clock is adjusted, so that the time on the local clock of the domain controller of the intelligent driving device is gradually synchronized with the time of the external clock source, and the amount by which the clock frequency is adjusted in the frequency synchronization manner is greater than the amount by which the clock frequency is adjusted in the locking manner.

Figure 3:
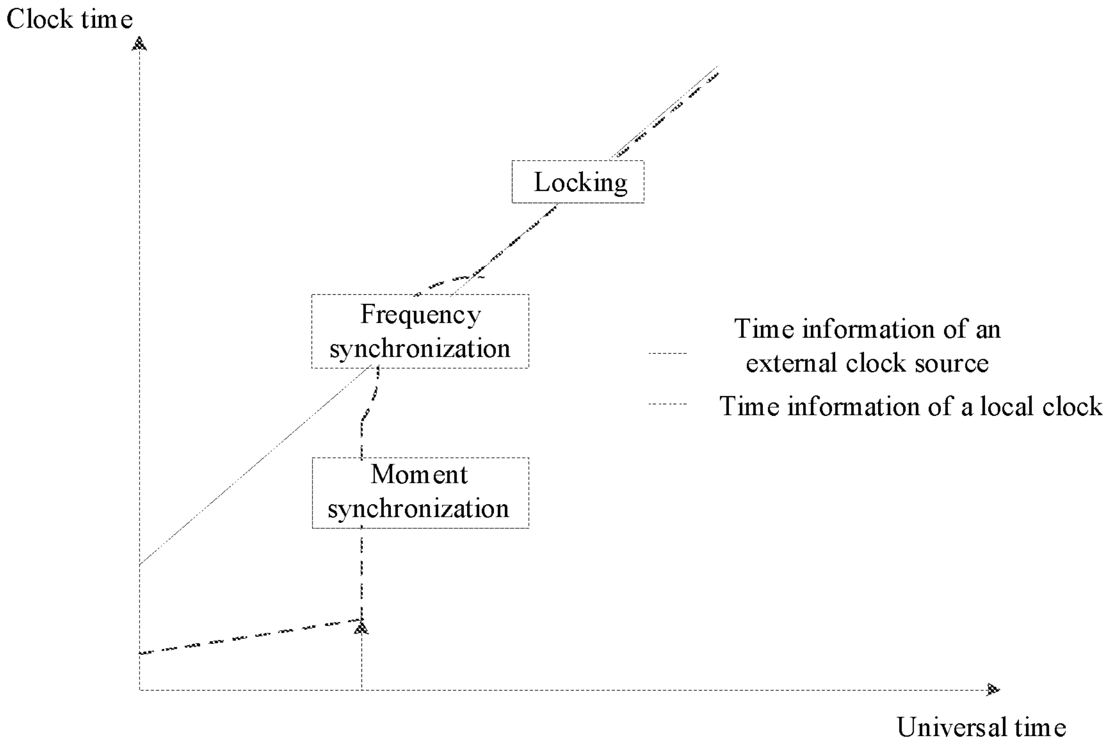
FIG. 3 is a schematic diagram of dynamically adjusting time synchronization manners according to an embodiment of the present disclosure.

Therefore, on the premise that security of the intelligent driving device is ensured, as shown in FIG. 3, if the time difference between time information of the local clock and the time information of the external clock source is large, in this case, if time synchronization processing is performed by using the frequency synchronization manner and the locking manner, it may take a long time to synchronize the time information of the local clock to the time information of the external clock source. In this case, to quickly synchronize the time information of the local clock to the time information of the external clock source, the moment synchronization manner may be used as the target time synchronization manner on the premise that security of the intelligent driving device is ensured. However, if the time difference between the time information of the local clock and the time information of the external clock source is not large, it indicates that if time synchronization processing is performed by using the frequency synchronization manner and the locking manner, the time information of the local clock can also be synchronized to the time information of the external clock source at a fast speed. In this case, on the premise that security of the intelligent driving device is ensured, to further enable each algorithm in the intelligent driving device to run stably, the frequency synchronization manner and the locking manner may be used to perform adjustment. Further, when the frequency synchronization manner and the locking manner are used, it may be specifically determined whether the time difference between the time information of the current local clock and the time information of the external clock source reaches an expected precision. If the expected precision is reached, it can be determined that time synchronization processing is performed only by using the locking manner, to ensure that a deviation does not increase.

In a possible implementation, to determine whether the time difference between the time information of the local clock and the time information of the external clock source corresponds to a large time difference or a small time difference, a first time threshold and a second time threshold may be set. The first time threshold is a preset minimum value of the difference between the time information of the external clock source and the time information of the local clock, and the second time threshold is a preset maximum value of the difference between the time information of the external clock source and the time information of the local clock. In this case, for example, the selecting a target time synchronization manner from the plurality of time synchronization manners based on the time difference includes: if the time difference is less than the first time threshold, determining that the locking manner is the target time synchronization manner; if the time difference is greater than the first time threshold and less than the second time threshold, determining that the frequency synchronization manner is the target time synchronization manner; or if the time difference is greater than the second time threshold, determining that the moment synchronization manner is the target time synchronization manner. The first time threshold is the preset minimum value of the time difference between the time information of the external clock source and the time information of the local clock, and the second time threshold is the preset maximum value of the time difference between the time information of the external clock source and the time information of the local clock.

However, it should be noted that, when the target time synchronization manner is determined by using the time difference between the time information of the local clock and the time information of the external clock source, the target time synchronization manner should first be included in the plurality of time synchronization manners corresponding to the driving status. That is, a premise is that security of the intelligent driving device is ensured.

For example, if the current driving status of the intelligent driving device is the pre-start state, and time synchronization manners included in the pre-start state include the moment synchronization manner, the frequency synchronization manner, and the locking manner, it is proved that the pre-start state has extremely low sensitivity to time. That is, regardless of a time synchronization manner, security of the intelligent driving device is not affected. In this case, if the time difference between the time information of the local clock and the time information of the external clock source is large, the moment synchronization manner may be used, so that the time on the local clock is quickly adjusted to the time on the external clock.

In still another example, if the current driving status of the intelligent driving device is the start state, and time synchronization manners in the start state include the frequency synchronization manner and the locking manner, it is proved that the start state has medium sensitivity to time. That is, if the moment synchronization manner is used, problem traceability and fault locatability of the function of the intelligent driving device may be affected. However, if the time difference between the time information of the local clock and the time information of the external clock source is still large, the moment synchronization manner cannot be used. Instead, only the frequency synchronization manner or the locking manner can be selected to perform gradual synchronization.

In this implementation, the domain controller of the intelligent driving device may perform, based on the time difference between the time information of the local clock and the time information of the external clock source, time synchronization processing on the local clock by using different time synchronization manners. When the time difference is large, the moment synchronization manner is used to quickly synchronize the time on the local clock with time of the external clock source. When the time difference is small, the frequency synchronization manner or the locking manner is used to synchronize the time on the local clock with time of the external clock source in a stable manner.

Optionally, when it is determined that the frequency synchronization manner is the target time synchronization manner, the performing, based on the time information of the external clock source, time synchronization processing on the local clock by using the target time synchronization manner includes: determining, according to a formula $\Delta f_{adjust}=a_0\Delta T+a_1\Delta f+a_2 v+a_3P_0+a_4P_1+ \ldots +a_{n+3}P_n$, a clock frequency adjustment value of the local clock that is used when time synchronization processing is performed on the local clock; and adjusting a clock frequency of the local clock based on the clock frequency adjustment value, where $\Delta f_{adjust}$ represents the clock frequency adjustment value of the local clock, $\Delta T$ represents the time difference, $\Delta f$ represents a frequency difference between a clock frequency of the external clock source and the clock frequency of the local clock, v represents a traveling speed of the driving device, $P_i$ represents a parameter required by an $i^{th}$ service in the intelligent driving device for the frequency synchronization manner, and $a_i$ represents a coefficient.

It may be understood that, if the domain controller of the intelligent driving device receives time information of an external clock source and determines, based on a time difference, to use the frequency synchronization manner, the domain controller of the intelligent driving device needs to determine the clock frequency adjustment value of the local clock when performing synchronization processing.

In this embodiment, when synchronization processing is performed by using the frequency synchronization manner, in comparison with a conventional technology, a vehicle speed of the intelligent driving device and the parameter required by the $i^{th}$ service in the intelligent driving device for the frequency synchronization manner are further combined.

The service is, for example, an entertainment application service or a navigation service. It may be understood that, different services also have requirements on the clock frequency adjustment value. For example, because the navigation service needs to perform precise positioning, the time on the local clock needs to be kept unchanged as much as possible. Therefore, the clock frequency adjustment value of the local clock is expected to be as small as possible. For the entertainment application service, a change of the clock frequency of the local clock may not have a great impact on the entertainment application service, and obtaining accurate time information of the external clock source is even more necessary for the entertainment application service. Therefore, the entertainment application service expects that the clock frequency adjustment value of the local clock is as large as possible, to be synchronized to the time information of the external clock source more quickly. In this case, the clock frequency adjustment value is obtained by combining the vehicle speed of the intelligent driving device and the parameter required by the service in the intelligent driving device for the frequency synchronization manner, so that the obtained clock frequency adjustment value can integrate requirements of the services of the intelligent driving device in the current driving status, and robustness is therefore improved.

Figure 4:
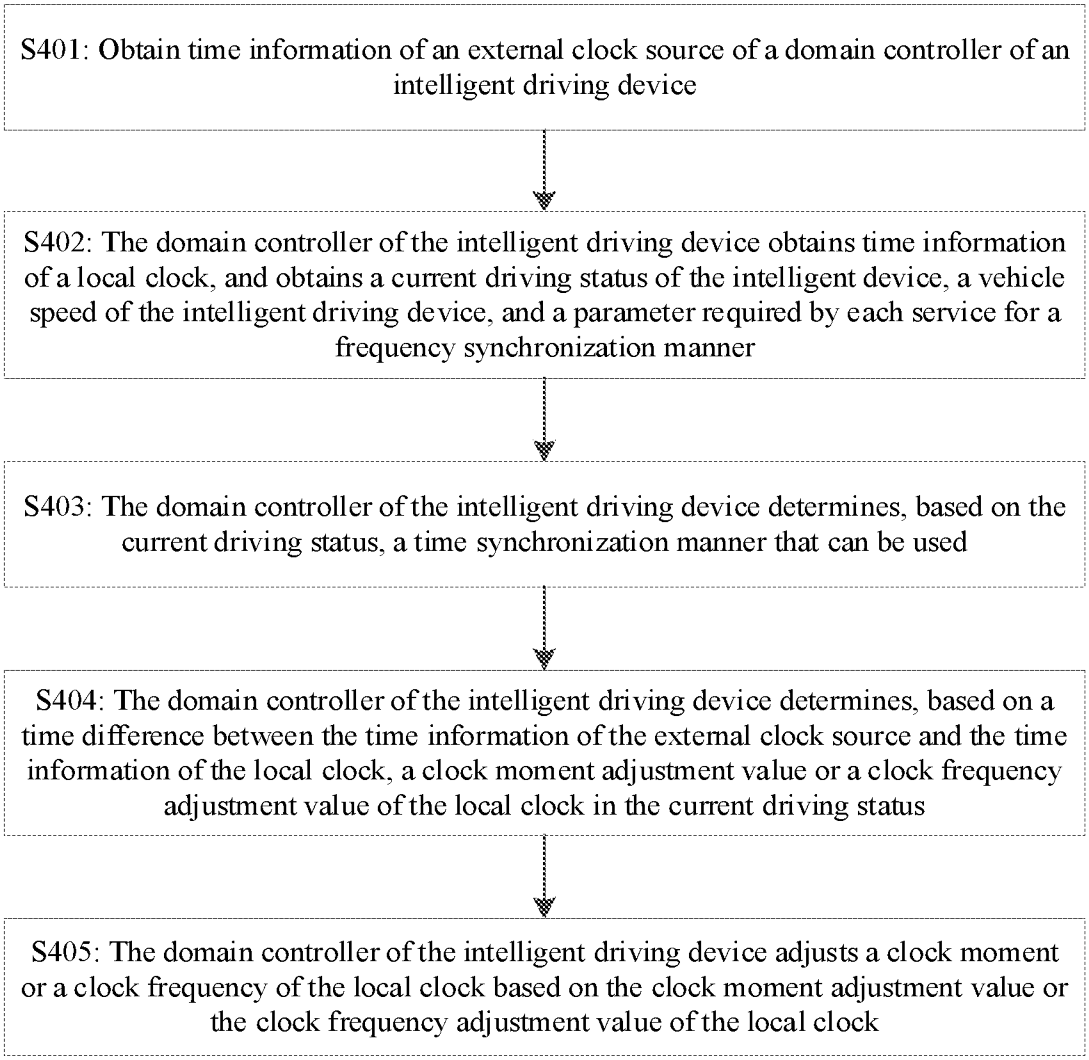
FIG. 4 is a schematic flowchart of a time synchronization method according to another embodiment of the present disclosure.

For ease of understanding, FIG. 4 is a schematic flowchart of a time synchronization method according to another embodiment of the present disclosure. In the embodiment shown in FIG. 4, the domain controller of the intelligent driving device may perform the time synchronization method. As shown in FIG. 4, the method provided in this embodiment of the present disclosure includes S401, S402, S403, S404, and S405. The following describes the steps in the method shown in FIG. 4 in detail.

S401: Obtain time information of an external clock source of the domain controller of the intelligent driving device.

For a specific description of this step, refer to the description in S201 in the embodiment shown in FIG. 2.

In this embodiment, when the domain controller of the intelligent driving device obtains the time information of the external clock source, the time information of the external clock source may include moment information of the external clock source and/or a clock frequency of the external clock source.

It should be noted herein that in this embodiment, the time information of the external clock source obtained by the domain controller of the intelligent driving device may further include more information, for example, link delay information. The link delay information may be considered as a delay of sending the time information of the external clock source of the domain controller of the intelligent driving device to the domain controller of the intelligent driving device. For a specific description, refer to the description in the conventional technology.

S402: The domain controller of the intelligent driving device obtains time information of a local clock, and obtains a current driving status of the intelligent device, a vehicle speed of the intelligent driving device, and a parameter required by each service for a frequency synchronization manner.

The time information of the local clock includes moment information of the local clock and/or clock frequency information of the local clock.

In this embodiment, in addition to obtaining the time information of the local clock, the domain controller of the intelligent driving device further needs to obtain the current driving status of the intelligent device, the vehicle speed of the intelligent driving device, and the parameter required by each service for the frequency synchronization manner. For detailed descriptions of a driving status and the parameter required by each service for the frequency synchronization manner, refer to the descriptions in the foregoing embodiments of the present disclosure.

In a possible implementation, the domain controller of the intelligent driving device may obtain the moment information of the local clock and/or the clock frequency information of the local clock by using a system call function. The current driving status of the intelligent device, the vehicle speed of the intelligent driving device, and the parameter required by each service for the frequency synchronization manner are obtained by using a system service interface. For related concepts and descriptions of the system call function and the system service interface, refer to descriptions in the conventional technology.

S403: The domain controller of the intelligent driving device determines, based on the current driving status, a time synchronization manner that can be used.

In this embodiment, there is no or at least one time synchronization manner that may be used. When there is no time synchronization manner that may be used, it indicates that time synchronization processing is not performed. When at least one time synchronization manner is included, it indicates that time synchronization processing needs to be performed.

This embodiment is described by using a time synchronization manner that may be selected for each driving status shown in Table 1 as an example.

Table 1 is used as an example. After obtaining the current driving status, the domain controller of the intelligent driving device may determine, based on a mapping table in Table 1, whether time synchronization processing needs to be performed or time synchronization processing does not need to be performed in the current driving status; and further determine, when time synchronization processing needs to be performed, which type of time synchronization manner may be selected in the current driving status.

For example, if the current driving status is a pre-start state or a standby state, it may be determined, based on the mapping table in Table 1, that the time synchronization manner that may be selected includes a moment synchronization manner, a frequency synchronization manner, and a locking manner. If the current driving status is a start state or an upgrade state, it may be determined, based on the mapping table in Table 1, that the time synchronization manner that may be selected includes the frequency synchronization manner and the locking manner. If the current driving status is an assisted driving state or a self-driving state, it may be determined, based on the mapping table in Table 1, that time synchronization processing does not need to be performed.

S404: The domain controller of the intelligent driving device determines, based on a time difference between the time information of the external clock source and the time information of the local clock, a clock moment adjustment value or a clock frequency adjustment value of the local clock in the current driving status.

It may be understood that the domain controller of the intelligent driving device generally performs time synchronization processing by calling a corresponding time synchronization processing function, and a process of calling the time synchronization processing function to perform time synchronization processing generally has a call delay. Therefore, in this embodiment, the clock moment adjustment value and the clock frequency adjustment value are used to perform time synchronization processing, so that the call delay may be avoided.

It is assumed that the time information of the local clock is $t_{local}$, the time information of the external clock source is $t_{source}$, the time difference between the time information of the local clock and the time information of the external clock source is $\Delta T$, a first time threshold is $\Delta T_{min}$, and a second time threshold is $\Delta T_{max}$, where $\Delta T_{min}$ is a preset minimum value of the difference between the time information of the external clock source and the time information of the local clock, and $\Delta T_{max}$ is a preset maximum value of the difference between the time information of the external clock source and the time information of the local clock.

Therefore, in this embodiment, if $\Delta T > \Delta T_{max}$, it indicates that the time difference between the time information of the local clock and the time information of the external clock source is large. In this case, if time synchronization processing is performed in the frequency synchronization manner and the locking manner, it may take a long time to synchronize the time information of the local clock to the time information of the external clock source. Therefore, to quickly synchronize the time information of the local clock to the time information of the external clock source, the moment synchronization manner may be used as a target time synchronization manner on a premise that security of the intelligent driving device is ensured.

When the moment synchronization manner is used, if the clock moment adjustment value of the domain controller of the intelligent driving device for the local clock is represented by $\Delta t_{adjust}$, $\Delta t_{adjust} = \Delta T = t_{source} - t_{local}$. $\Delta t_{adjust}$ indicates the clock moment adjustment value of the local clock, $t_{source}$ indicates a clock moment of the external clock source, $t_{local}$ indicates a clock moment of the local clock, and $\Delta T$ indicates a difference between the clock moment of the external clock source and the clock moment of the local clock. For example, if the clock moment of the local clock of the domain controller of the intelligent driving device is 10:00, and the clock moment of the external clock source is 12:00, the time difference between the time information of the local clock and the time information of the external clock source is two hours. It is assumed that the second time threshold $\Delta T_{max}$ is one hour. When the domain controller of the intelligent driving device adjusts the clock moment, the clock moment adjustment value is equal to two hours.

In this embodiment, if $\Delta T_{min}<\Delta T<\Delta T_{max}$, it indicates that the difference between the time information of the local clock and the time information of the external clock source is medium. If time synchronization processing is performed in the frequency synchronization manner and the locking manner, the time information of the local clock can also be synchronized to the time information of the external clock source at a fast speed. In this case, on the premise that security of the intelligent driving device is ensured, to further enable each algorithm in the domain controller of the intelligent driving device to run stably, the frequency synchronization manner may be used for adjustment.

If the frequency synchronization manner is used, and the frequency adjustment value of the domain controller of the intelligent driving device for the local clock is represented by $\Delta f_{adjust}$, $$\Delta f_{adjust} = a_0\Delta T + a_1\Delta f + a_2 v + a_3 p_0 + a_4 p_1 + \ldots a_{n+3} p_n$$

$\Delta f_{adjust}$ represents the clock frequency adjustment value, $\Delta f$ represents a frequency difference between the clock frequency of the external clock source and a clock frequency of the local clock, v represents the current vehicle speed of the intelligent driving device, and $p_0$, $p_1$, and $p_n$ represent parameters required by other service applications for the "frequency synchronization manner". $a_0$, $a_1$, . . . , and $a_{n+3}$ each represent a coefficient corresponding to each parameter, and may be set based on a specific scenario and an empirical value.

In this embodiment, if $\Delta T<\Delta T_{min}$, it indicates that the difference between the time information of the local clock and the time information of the external clock source is excessively small, and almost achieves an expected precision. In this case, only a slight adjustment needs to be performed on the clock frequency of the local clock, to ensure a scenario in which a deviation between the clock moment of the local clock and the moment of the external clock source does not increase.

If the locking synchronization manner is used, the frequency adjustment value of the intelligent driving device for the local clock is:

$$\Delta f_{adjust} = a_1\Delta f + a_2\int f + a_3 df$$

$\int f$ indicates an integral of the clock frequency, and df indicates a differential of the clock frequency.

Therefore, if the domain controller of the intelligent driving device determines that more than one time synchronization manner can be used for the current driving status, the clock moment adjustment value or the clock frequency adjustment value of the local clock may be determined based on the time difference between the time information of the local clock and the time information of the external clock source.

However, it should be noted that, if a used time synchronization manner that is determined based on the time difference between the time information of the local clock and the time information of the external clock source is not included in the time synchronization manner that can be used in the current driving status, the used time synchronization manner still cannot be determined based on the time difference between the time information of the local clock and the time information of the external clock source.

For example, Table 1 is used as an example. If the current driving status of the intelligent driving device is the pre-start state, time synchronization manners included in the pre-start state include the moment synchronization manner, the frequency synchronization manner, and the locking manner. That is, regardless of a time synchronization manner, security of the intelligent driving device is not affected. In this case, if $\Delta T>\Delta T_{max}$ the moment synchronization manner may be used, so that the moment of the local clock of the domain controller of the intelligent driving device is immediately adjusted to the moment of the external clock source. Further, after the moment synchronization manner is used, if $\Delta T_{min}<\Delta T<\Delta T_{max}$ in the current driving status after a period of time, the moment synchronization manner is no longer needed, but the frequency synchronization manner may be selected. Still further, if $\Delta T<\Delta T_{min}$ in the current driving status after a period of time, the locking manner may be selected, so that more stable tracking is implemented.

In another example, Table 1 is used as an example. If the current driving status of the intelligent driving device is the start state, time synchronization manners in the start state include the frequency synchronization manner and the locking manner. That is, if the moment synchronization manner is used, problem traceability and fault locatability of the intelligent driving device after an accident happens may be affected. However, if the time difference between the time information of the local clock and the time information of the external clock source is still large, the moment synchronization manner cannot be used. Instead, only the frequency synchronization manner or the locking manner can be selected to perform gradual synchronization.

In still another example, if the current driving status of the intelligent driving device is the assisted driving state or the self-driving state, even if a current $\Delta T$ is extremely small, no adjustment is allowed to be performed on the clock moment or the clock frequency of the local clock.

S405: The domain controller of the intelligent driving device adjusts the clock moment or the clock frequency of the local clock based on the clock moment adjustment value or the clock frequency adjustment value of the local clock.

In a possible implementation, the clock moment or the clock frequency of the local clock may be adjusted by calling a function that is in the intelligent driving device and that can perform time synchronization processing, for example, a system function "clock_adjtime(CLOCK_REALTIME, & $\Delta t_{adjust}$)" of a Linux operating system, to complete time synchronization processing.

According to the time synchronization method provided in this embodiment of the present disclosure, after obtaining the current driving status, the domain controller of the intelligent driving device may adjust, based on different time deviations, the clock moment or the clock frequency of the local clock by using different time synchronization manners, so that time synchronization processing can be further performed on the premise that security of the intelligent driving device is ensured.

Figure 5:
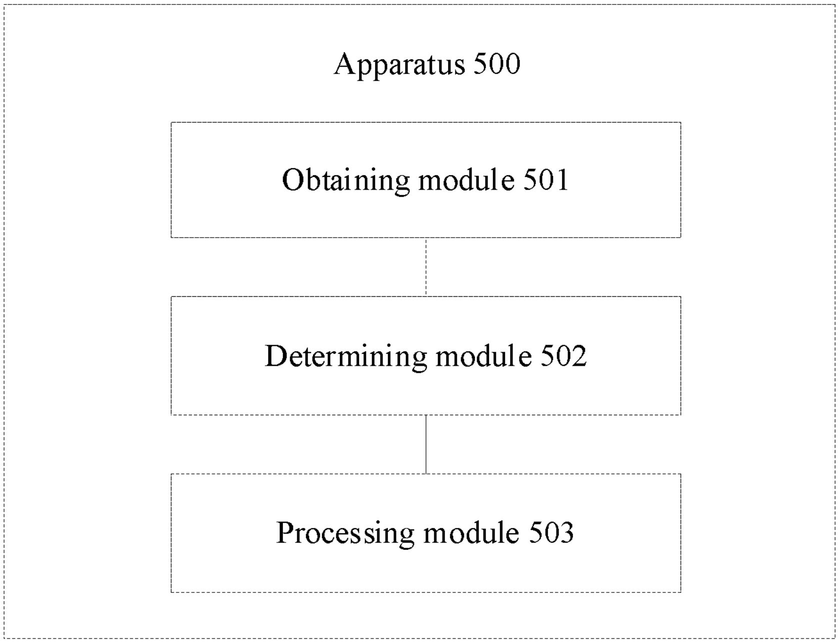
FIG. 5 is a schematic diagram of a structure of a time synchronization apparatus according to an embodiment of the present disclosure.

FIG. 5 is a schematic diagram of a structure of a time synchronization apparatus according to an embodiment of the present disclosure. The apparatus 500 is applied to a domain controller of an intelligent driving device and includes: an obtaining module 501 configured to obtain time information of an external clock source of the domain controller of the intelligent driving device and a current driving status of the intelligent driving device; a determining module 502 configured to determine whether the current driving status is a driving status in which time synchronization processing needs to be performed on a local clock of the domain controller; and a processing module 503 configured to: if the current driving status is the driving status in which time synchronization processing needs to be performed, perform time synchronization processing on the local clock based on the time information of the external clock source.

In an example, the obtaining module 501 may be configured to perform the step of obtaining the time information of the external clock source of the domain controller of the intelligent driving device in the method shown in FIG. 2. For example, the obtaining module 501 is configured to perform S201.

With reference to a second aspect, in a possible implementation, one or more of the following states of the intelligent driving device are the driving statuses in which time synchronization processing needs to be performed: a pre-start state, a start state, a standby state, or an upgrade state; and one or more of the following states of the intelligent driving device are driving statuses in which time synchronization processing does not need to be performed: an assisted driving state, a self-driving state, a sleep state, or a power-off state.

With reference to the second aspect, in a possible implementation, the obtaining module 501 is further configured to obtain time synchronization information, where the time synchronization information includes a time synchronization manner corresponding to each of at least one driving status of the intelligent driving device, and the at least one driving status includes the current driving status. The determining module 502 is specifically configured to: when determining, based on the time synchronization information, that a time synchronization manner corresponding to the current driving status is not empty, determine that the current driving status is the driving status in which time synchronization processing needs to be performed on the local clock.

In a possible implementation, a plurality of time synchronization manners corresponding to any one of one or more of the following states include a moment synchronization manner, a frequency synchronization manner, and a locking manner: the pre-start state or the standby state; and a plurality of time synchronization manners corresponding to any one of one or more of the following states include the frequency synchronization manner and the locking manner: the start state or the upgrade state.

In a possible implementation, when the current driving status corresponds to the plurality of time synchronization manners, the obtaining module 501 is further configured to obtain time information of the local clock of the domain controller of the intelligent driving device. The processing module 503 is specifically configured to: determine a time difference between the time information of the local clock and the time information of the external clock source based on the time information of the local clock and the time information of the external clock source; select a target time synchronization manner from the plurality of time synchronization manners based on the time difference; and perform, based on the time information of the external clock source, time synchronization processing on the local clock by using the target time synchronization manner.

In a possible implementation, the processing module 503 is specifically configured to: if the time difference is less than a first time threshold, determine that the locking manner is the target time synchronization manner; if the time difference is greater than a first time threshold and less than a second time threshold, determine that the frequency synchronization manner is the target time synchronization manner; or if the time difference is greater than a second time threshold, determine that the moment synchronization manner is the target time synchronization manner. The first time threshold is a preset minimum value of the time difference between the time information of the external clock source and the time information of the local clock, and the second time threshold is a preset maximum value of the time difference between the time information of the external clock source and the time information of the local clock.

In a possible implementation, when determining that the frequency synchronization manner is the target time synchronization manner, the processing module 503 is specifically configured to: determine, according to a formula $\Delta f_{adjust}=a_0\Delta T+a_1\Delta f+a_2 v+a_3P_0+a_4P_1+ \ldots +a_{n+3}P_n$, a clock frequency adjustment value of the local clock that is used when time synchronization processing is performed on the local clock; and adjusting a clock frequency of the local clock based on the clock frequency adjustment value, where $\Delta f_{adjust}$ represents the clock frequency adjustment value of the local clock, $\Delta T$ represents the time difference, $\Delta f$ represents a frequency difference between a clock frequency of the external clock source and the clock frequency of the local clock, v represents a traveling speed of the driving device, $P_i$ represents a parameter required by an $i^{th}$ service in the intelligent driving device for the frequency synchronization manner, and $a_i$ represents a coefficient.

Figure 6:
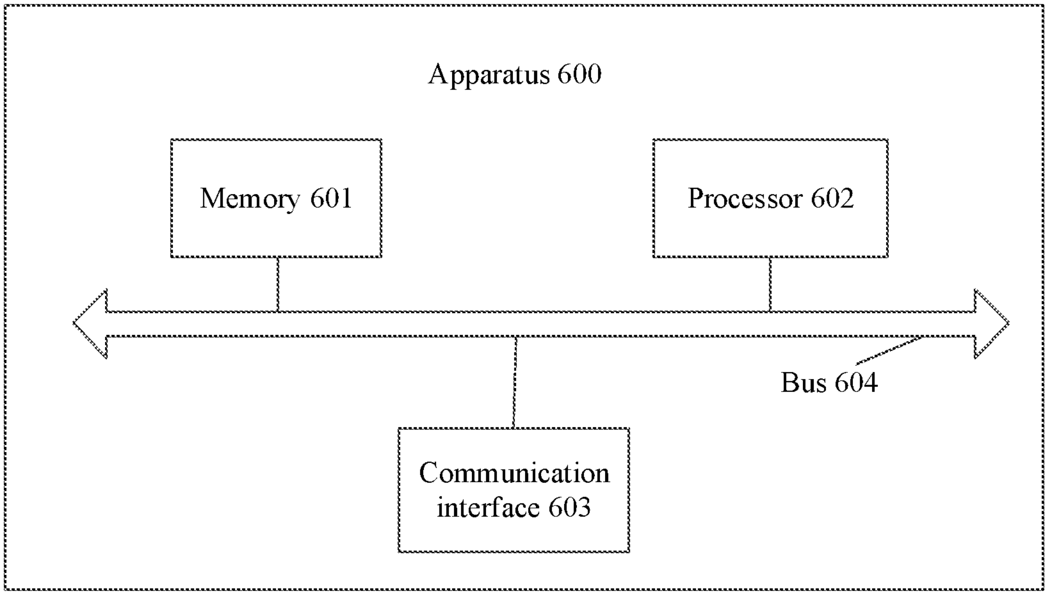
FIG. 6 is a schematic diagram of a structure of a time synchronization apparatus according to another embodiment of the present disclosure.

FIG. 6 is a schematic diagram of a structure of a time synchronization apparatus according to another embodiment of the present disclosure. The apparatus shown in FIG. 6 may be configured to perform the method according to any one of the foregoing embodiments.

As shown in FIG. 6, the apparatus 600 in this embodiment includes a memory 601, a processor 602, a communication interface 603, and a bus 604. The memory 601, the processor 602, and the communication interface 603 are communicatively connected to each other through the bus 604.

The memory 601 may be a read-only memory (ROM), a static storage device, a dynamic storage device, or a random-access memory (RAM). The memory 601 may store a program. When the program stored in the memory 601 is executed by the processor 602, the processor 602 is configured to perform the steps of the method shown in FIG. 2 or FIG. 4.

The processor 602 may be a general-purpose central processing unit (CPU), a microprocessor, an application-specific integrated circuit (ASIC), or one or more integrated circuits. The processor 602 is configured to execute a related program, to implement the method shown in FIG. 2 or FIG. 4.

The processor 602 may alternatively be an integrated circuit chip and has a signal processing capability. In an implementation process, the steps of the method shown in FIG. 2 or FIG. 4 in embodiments of the present disclosure may be completed by using an integrated logic circuit of hardware in the processor 602 or by using instructions in a form of software.

The processor 602 may alternatively be a general-purpose processor, a digital signal processor (DSP), an ASIC, a field-programmable gate array (FPGA) or another programmable logic device, a discrete gate or a transistor logic device, or a discrete hardware component. The processor 602 may implement or perform the methods, steps, and logical block diagrams that are disclosed in embodiments of the present disclosure. The general-purpose processor may be a microprocessor, or the processor may be any conventional processor, or the like.

The steps in the methods disclosed with reference to embodiments of the present disclosure may be directly performed and completed by a hardware decoding processor, or may be performed and completed by a combination of hardware and a software module in the decoding processor. The software module may be located in a mature storage medium in the art such as a RAM, a flash memory, a ROM, a programmable ROM, an electrically erasable programmable memory, or a register. The storage medium is located in the memory 601. The processor 602 reads information in the memory 601, and completes, in combination with the hardware in the processor 602, functions that need to be performed by units included in an apparatus in the present disclosure. For example, the processor 602 may perform the steps/functions in the embodiment shown in FIG. 2 or FIG. 4.

The communication interface 603 may use, but is not limited to, a transceiver apparatus such as a transceiver, to implement communication between the apparatus 600 and another device or a communication network.

The bus 604 may include a path for transmitting information between components (for example, the memory 601, the processor 602, and the communication interface 603) of the apparatus 600.

It should be understood that the apparatus 600 shown in this embodiment of the present disclosure may be an electronic device, or may be a chip configured in an electronic device.

All or some of the foregoing embodiments may be implemented by using software, hardware, firmware, or any combination thereof. When the software is used to implement the embodiments, all or some of the foregoing embodiments may be implemented in a form of a computer program product. The computer program product includes one or more computer instructions or computer programs. When the program instructions or the computer programs are loaded and executed on the computer, the procedure or functions according to embodiments of the present disclosure are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired or wireless (for example, infrared, radio, or microwave) manner. The computer-readable storage medium may be any usable medium that can be accessed by a computer, or a data storage device, for example, a server or a data center in which one or more usable media are integrated. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In the present disclosure, "at least one" means one or more, and "a plurality of" means two or more. "At least one of the following items" or a similar expression thereof refers to any combination of these items, including a singular item or any combination of plural items. For example, "at least one of a, b, and c" may represent a, b, c, a-b, a-c, b-c, or a-b-c, where a, b, and c may be singular or plural.

It should be understood that, in embodiments of the present disclosure, sequence numbers of the foregoing processes do not mean execution sequences. The execution sequences of the processes should be determined based on functions and internal logic of the processes, and should not be construed as any limitation on the implementation processes of the embodiments of the present disclosure.

A person of ordinary skill in the art may be aware that units and algorithm steps in examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in embodiments of the present disclosure may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in the present disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of the present disclosure. The preceding storage medium includes: any medium capable of storing program code, such as a Universal Serial Bus (USB) flash drive, a removable hard disk, a ROM, a RAM, a magnetic disk, or an optical disc.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:

obtaining first time information of an external clock source of a domain controller of an intelligent driving device;

obtaining a current driving status of the intelligent driving device;

determining whether the current driving status is a driving status in which time synchronization processing needs to be performed on a local clock of the domain controller; and performing, when the current driving status is the driving status in which the time synchronization processing needs to be performed, the time synchronization processing on the local clock based on the first time information.

2. The method of claim 1, wherein first driving statuses in which the time synchronization processing needs to be performed comprise a pre-start state, a start state, a standby state, or an upgrade state, and wherein second driving statuses in which the time synchronization processing does not need to be performed comprise an assisted driving state, a self-driving state, a sleep state, or a power-off state.

3. The method of claim 2, further comprising obtaining time synchronization information, wherein the time synchronization information comprises a time synchronization manner corresponding to each of at least one driving status of the intelligent driving device, and wherein the at least one driving status comprises the current driving status, and wherein determining whether the current driving status is the driving status in which the time synchronization processing needs to be performed on the local clock of the domain controller comprises determining, when the time synchronization manner corresponding to the current driving status is not empty, that the current driving status is the driving status in which the time synchronization processing needs to be performed on the local clock.

4. The method of claim 3, wherein a first plurality of time synchronization manners corresponds to any one of one or more first states, wherein the first plurality of time synchronization manners comprises a moment synchronization manner, a frequency synchronization manner, and a locking manner, and wherein the first states comprises the pre-start state or the standby state, wherein a second plurality of time synchronization manners corresponds to any one of one or more second states, wherein the second plurality of time synchronization manners comprises the frequency synchronization manner and the locking manner, and wherein the second states comprise the start state or the upgrade state.

5. The method of claim 4, wherein performing the time synchronization processing on the local clock based on the first time information comprises:

obtaining second time information of the local clock of the domain controller;

determining a time difference between the second time information and the first time information;

selecting, when the current driving status is one of the first states, a target time synchronization manner from the first plurality of time synchronization manners based on the time difference, or selecting, when the current driving status is one of the second states, the target time synchronization manner from the second plurality of time synchronization manners based on the time difference; and performing, based on the first time information, the time synchronization processing on the local clock by using the target time synchronization manner.

6. The method of claim 5, wherein selecting the target time synchronization manner comprises:

determining, when the time difference is less than a first time threshold, that the locking manner is the target time synchronization manner, wherein the first time threshold is a preset minimum value of the time difference.

7. The method of claim 6, wherein when the frequency synchronization manner is the target time synchronization manner, performing the time synchronization processing on the local clock comprises:

determining, according to a formula $\Delta f_{adjust}=a_0\Delta T+a_1\Delta f+a_2v+a_3P_0+a_4P_1+\ldots+a_{n+3}P_n$, a clock frequency adjustment value of the local clock, wherein $\Delta f_{adjust}$ represents the clock frequency adjustment value, $\Delta T$ represents the time difference, $\Delta f$ represents a frequency difference between a first clock frequency of the external clock source and a second clock frequency of the local clock, v represents a traveling speed of the intelligent driving device, $P_i$ represents a parameter required by an $i^{th}$ service in the intelligent driving device for the frequency synchronization manner, and $a_i$ represents a coefficient; and adjusting the second clock frequency based on the clock frequency adjustment value.

8. An apparatus comprising:

a memory configured to store program instructions; and a processor coupled to the memory and configured to invoke the program instructions to:

obtain first time information of an external clock source of a domain controller of an intelligent driving device and a current driving status of the intelligent driving device;

determine whether the current driving status is a driving status in which time synchronization processing needs to be performed on a local clock of the domain controller; and perform, when the current driving status is the driving status in which the time synchronization processing needs to be performed, the time synchronization processing on the local clock based on the first time information.

9. The apparatus of claim 8, wherein first driving statuses in which the time synchronization processing needs to be performed comprise a pre-start state, a start state, a standby state, or an upgrade state, and wherein second driving statuses in which the time synchronization processing does not need to be performed comprise an assisted driving state, a self-driving state, a sleep state, or a power-off state.

10. The apparatus of claim 9, wherein the processor is further configured to invoke the program instructions to:

obtain time synchronization information, wherein the time synchronization information comprises a time synchronization manner corresponding to each of at least one driving status of the intelligent driving device, and wherein the at least one driving status comprises the current driving status; and determine, when the time synchronization manner corresponding to the current driving status is not empty, that the current driving status is the driving status in which the time synchronization processing needs to be performed on the local clock.

11. The apparatus of claim 10, wherein a first plurality of time synchronization manners corresponds to any one of one or more first states, wherein the first plurality of time synchronization manners comprises a moment synchronization manner, a frequency synchronization manner, and a locking manner, and wherein the first states comprise the pre-start state or the standby state; and wherein a second plurality of time synchronization manners corresponding to any one of one or more second states, wherein the second plurality of time synchronization manners comprises the frequency synchronization manner and the locking manner, and wherein the second states comprise the start state or the upgrade state.

12. The apparatus of claim 11, wherein the processor is further configured to invoke the program instructions to:

obtain second time information of the local clock of the domain controller;

determine a time difference between the second time information and the first time information;

select, when the current driving status is one of the first states, a target time synchronization manner from the first plurality of time synchronization manners based on the time difference, or select, when the current driving status is one of the second states, the target time synchronization manner from the second plurality of time synchronization manners based on the time difference; and perform, based on the first time information, the time synchronization processing on the local clock by using the target time synchronization manner.

13. The apparatus of claim 12, wherein the processor is further configured to invoke the program instructions to:

determine, when the time difference is greater than a first time threshold and less than a second time threshold, that the frequency synchronization manner is the target time synchronization manner, wherein the first time threshold is a preset minimum value of the time difference, and wherein the second time threshold is a preset maximum value of the time difference.

14. The apparatus of claim 13, wherein when determining that the frequency synchronization manner is the target time synchronization manner, the processor is further configured to invoke the program instructions to:

determine, according to a formula $\Delta f_{adjust}=a_0\Delta T+a_1\Delta f+a_{20}+a_3P_0+a_4P_1+\ldots+a_{n+3}P_n$, a clock frequency adjustment value of the local clock that is used when the time synchronization processing is performed on the local clock, wherein $\Delta f_{adjust}$ represents the clock frequency adjustment value, $\Delta T$ represents the time difference, $\Delta f$ represents a frequency difference between a first clock frequency of the external clock source and a second clock frequency of the local clock, v represents a traveling speed of the intelligent driving device, $P_i$ represents a parameter required by an $i^{th}$ service in the intelligent driving device for the frequency synchronization manner, and $a_i$ represents a coefficient; and adjust the second clock frequency based on the clock frequency adjustment value.

15. A non-transitory machine-readable medium storing instructions that, when executed by a processor, cause an apparatus to:

obtain first time information of an external clock source of a domain controller and a current driving status of an intelligent driving device;

determine whether the current driving status is a driving status in which time synchronization processing needs to be performed on a local clock of the domain controller; and perform, when the current driving status is the driving status in which the time synchronization processing needs to be performed, the time synchronization processing on the local clock based on the first time information.

16. The non-transitory machine-readable medium of claim 15, wherein first driving statuses in which the time synchronization processing needs to be performed comprise a pre-start state, a start state, a standby state, or an upgrade state, and wherein second driving statuses in which the time synchronization processing does not need to be performed comprise an assisted driving state, a self-driving state, a sleep state, or a power-off state.

17. The non-transitory machine-readable medium of claim 16, wherein the instructions, when executed by the processor, further cause the apparatus to:

obtain time synchronization information, wherein the time synchronization information comprises a time synchronization manner corresponding to each of at least one driving status of the intelligent driving device, and wherein the at least one driving status comprises the current driving status; and determine, when the time synchronization manner corresponding to the current driving status is not empty, that the current driving status is the driving status in which the time synchronization processing needs to be performed on the local clock.

18. The non-transitory machine-readable medium of claim 17, wherein a first plurality of time synchronization manners corresponds to any one of one or more first states, wherein the first plurality of time synchronization manners comprises a moment synchronization manner, a frequency synchronization manner, and a locking manner, and wherein the first states comprise the pre-start state or the standby state; and wherein a second plurality of time synchronization manners corresponds to any one of one or more second states, wherein the second plurality of time synchronization manners comprises the frequency synchronization manner and the locking manner, and wherein the second states comprise the start state or the upgrade state.

19. The non-transitory machine-readable medium of claim 18, wherein the instructions, when executed by the processor, further cause the apparatus to:

obtain second time information of the local clock of the domain controller;

determine a time difference between the second time information and the first time information;

select, when the current driving status is one of the first states, a target time synchronization manner from the first plurality of time synchronization manners based on the time difference, or select, when the current driving status is one of the second states, the target time synchronization manner from the second plurality of time synchronization manners based on the time difference; and perform, based on the first time information, the time synchronization processing on the local clock by using the target time synchronization manner.

20. The non-transitory machine-readable medium of claim 19, wherein the instructions, when executed by the processor, further cause the apparatus to:

determine, when the time difference is greater than a second time threshold, that the moment synchronization manner is the target time synchronization manner, wherein the second time threshold is a preset maximum value of the time difference.

* * * * *